US00RE48497E

(19) United States
(12) Reissued Patent
Amemura

(10) Patent Number: US RE48,497 E
(45) Date of Reissued Patent: Mar. 30, 2021

(54) SELECTIVELY LIMITING READ ACCESS TO A PORTABLE STORAGE DEVICE

(71) Applicant: Seagate Technology LLC, Cupertino, CA (US)

(72) Inventor: Tatsuaki Amemura, Osaka (JP)

(73) Assignee: Seagate Technology LLC, Fremont, CA (US)

(21) Appl. No.: 15/399,277

(22) Filed: Jan. 5, 2017

Related U.S. Patent Documents

Reissue of:
(64) Patent No.: 8,930,658
Issued: Jan. 6, 2015
Appl. No.: 13/421,098
Filed: Mar. 15, 2012

(30) Foreign Application Priority Data

Mar. 23, 2011 (JP) ..... 2011-064818

(51) Int. Cl.
*G06F 12/00* (2006.01)
*G06F 21/79* (2013.01)
*G06F 21/81* (2013.01)

(52) U.S. Cl.
CPC ..... *G06F 21/79* (2013.01); *G06F 21/81* (2013.01)

(58) Field of Classification Search
CPC ..... G06F 21/81; G06F 21/79; G06F 21/31
(Continued)

(56) References Cited

U.S. PATENT DOCUMENTS 5,978,919 A * 11/1999 Doi ..... G06F 21/31 726/36
7,178,167 B1 * 2/2007 Katoh ..... G06F 21/31 726/26

(Continued)

FOREIGN PATENT DOCUMENTS

JP 04-071090 3/1992
JP 04-071090 A 3/1992

(Continued)

OTHER PUBLICATIONS

U.S. Notice of Allowance on U.S. Appl. No. 13/421,098 dated Sep. 19, 2014.

(Continued)

*Primary Examiner* — B. James Peikari
(74) *Attorney, Agent, or Firm* — Hall Estill Attorneys at Law

(57) ABSTRACT

In electronic [equipment] *device* 1, [a limitation level on reading] *an access level to selectively control the ability to read* data from a USB flash drive (storage device) 2 is set [to a setting section] *by an access level setting unit* 3 [in advance]. The USB flash drive [2] ascertains the [setting at the setting section 3] *access level* when *the USB flash drive is* connected to the electronic [equipment 1 and limits reading data based on the determined setting] *device*. If the [limitation] *access* level does not [match with the condition for permitting data read-out as determined in USB flash drive 2] *permit the reading of data*, the USB flash drive [2] prohibits the electronic [equipment 1] *device* from reading out data *from a memory 24 of the USB flash drive by removing an application of power from the external device to the memory*. [By executing the processing for limiting data read-out at the side of the USB flash drive 2, unauthorized leakage of data can easily be prevented.]

21 Claims, 9 Drawing Sheets

(Amended)

(58) Field of Classification Search
USPC ..... 711/163, 100, 154, E12.001; 726/26, 36
See application file for complete search history.

(56) References Cited

U.S. PATENT DOCUMENTS

| | | | | |
|---|---|---|---|---|
| 2003/0137887 | A1 | 7/2003 | Nakabe et al. | |
| 2010/0235575 | A1 | 9/2010 | Yasaki et al. | |
| 2010/0250836 | A1* | 9/2010 | Sokolov et al. | 711/103 |
| 2011/0208913 | A1* | 8/2011 | Suzuki et al. | 711/115 |

FOREIGN PATENT DOCUMENTS

| | | | |
|---|---|---|---|
| JP | 2003-288564 | A | 10/2003 |
| JP | 2006-107244 | A | 4/2006 |
| JP | 2007-133770 | A | 5/2007 |
| JP | 2009-075959 | | 4/2009 |
| JP | 2009-075959 | A | 4/2009 |
| JP | 3151486 | | 6/2009 |
| JP | 3151486 | U | 6/2009 |
| JP | 2010-238216 | A | 10/2010 |
| JP | 2010-265553 | | 11/2010 |
| JP | 2010-265553 | A | 11/2010 |
| JP | 2011-031031 | | 2/2011 |
| JP | 2011-031031 | A | 2/2011 |
| JP | 2011-054580 | | 3/2011 |
| JP | 2011-054580 | A | 3/2011 |

OTHER PUBLICATIONS

U.S. Office Action on U.S. Appl. No. 13/421,098 dated May 9, 2014.

U.S. Office Action on U.S. Appl. No. 13/421,098 dated Nov. 21, 2013.

* cited by examiner (Amended)

(Amended)

(Amended)

(Amended)

FIG. 5

| LIMITATION LEVEL | PERMITTED OR PROHIBITED TO READ OUT DATA |
|---|---|
| { 1, 1, 1, 1, 1 } | PERMITTED |
| OTHER THAN { 1, 1, 1, 1, 1 } | PROHIBITED |

(Amended)

(Amended)

(Amended)

FIG. 8

| LIMITATION LEVEL | PERMITTED OR PROHIBITED TO READ OUT DATA |
|---|---|
| (1) { 1, 1, 1, 1, 1 } | PERMITTED FROM BOTH MEMORY SECTIONS |
| (2) { 1, 1, 1, 1, 0 }<br>⋮<br>{ 0, 1, 1, 1, 1 } | PERMITTED FROM THE FIRST MEMORY SECTION |
| (3) { 1, 1, 1, 0, 0 }<br>⋮<br>{ 0, 1, 1, 1, 0 } | PERMITTED FROM THE SECOND MEMORY SECTION |
| (4) OTHERS | PROHIBITED |

(Amended)

(Amended)

SELECTIVELY LIMITING READ ACCESS TO A PORTABLE STORAGE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a Broadening Reissue of U.S. Pat. No. 8,930,658 (previously U.S. patent application Ser. No. 13/421,098, filed Mar. 15, 2012), which claims priority under 35 U.S.C. § 119(a) to Japanese Patent Application No. 2011-064818 filed in Japan on Mar. 23, 2011, the entire contents of which are hereby incorporated by reference.

BACKGROUND

1. Technical Field

The present invention relates to an electronic equipment system including electronic equipment and a storage device connected to the electronic equipment, and also relates to the storage device.

2. Description of Related Art

Electronic equipment such as a notebook PC (Personal Computer) is often connected to an external device and is provided with a connection interface performing data transfer between the electronic equipment and the device. The connection interface may supply power to the device in addition to data transfer. An example of the connection interface includes a USB (Universal Serial Bus). Japanese Utility Model Registration No. 3151486 discloses USB 3.0 for an example of the connection interface.

A device compliant with USB, if it is a power-saving device, may be used only by connecting it to electronic equipment without the need for another power supply. Because of its versability, USB is employed in a number of types of devices. Specifically, a USB flash drive connected to electronic equipment by a USB connection interface can easily be portable and has been widespread in general because of its lowered cost and increased volume.

Due to the high convenience of the USB flash drive, however, unauthorized leakage of data may easily occur when such a USB flash drive is used. There is a measure against the unauthorized leakage of data, which stores special software in a USB flash drive and makes electronic equipment execute the software. This, however, may require complicated setting or a password, generating troublesome work which may often be disfavored. Furthermore, a number of limitations in use arise such as limitation of the OS (Operating System) in the electronic equipment which can use the USB flash drive with such a measure.

SUMMARY OF THE INVENTION

The present invention has been contrived in view of the above circumstances. An object of the present invention is to provide an electronic device and a storage device that can easily prevent unauthorized leakage of data by controlling the reading of data at the side of the storage device connected to the electronic device.

In an electronic system according to the present invention, the electronic system includes an electronic device and a storage device. The storage device may be connected to the electronic device such that data may be is read out from a memory unit of the storage device to the electronic device. The electronic device includes an access level setting unit which sets an access level for limiting read access to the memory unit of the storage device by the electronic device. The storage device includes an access control unit. The access control unit may include (i) an access level storage unit for storing a concrete (e.g., a fixed) limitation on read access to the memory unit in accordance with a given access level, (ii) an access level determination unit for determining the access level set by the access level setting unit when the storage device is connected to the electronic device, and (iii) an access restriction unit for restricting the reading of data from the memory unit in accordance with the fixed limitation and the access level determined by the access level determination unit.

In the electronic system according to the present invention, the access level storage unit stores a range of limitation levels for permitting the reading of data. The access restriction unit includes a permission unit for permitting the reading of data if the limitation level ascertained by the access level determination unit falls within the range, and a prohibition unit for prohibiting the reading of data if the limitation level ascertained by the access level determination unit does not fall within the range.

In the electronic system according to the present invention, the electronic device further includes a first power supply for supplying electric power to the storage device connected to the electronic device. The storage device further includes a data output unit for reading out and outputting data to the electronic device, and a second power supply for supplying electric power from the first power supply to the data output unit. The permission unit makes the second power supply supply electric power to the data output unit if the limitation level ascertained by the access level determination unit falls within the range. The prohibition unit makes the second power supply prohibit power from being supplied to the data output unit if the limitation level ascertained by the access level determination unit does not fall within the range.

In the electronic system according to the present invention, the memory unit of the storage device further includes a plurality of data storage portions or locations. The access level storage unit stores some range of a limitation level for permitting the reading of data from each of the plurality of data storage locations in the memory unit. The restriction unit includes a permission unit for permitting the reading of data from one or more specific data storage locations in the memory unit and for prohibiting the reading of data from the other data storage locations in the memory unit if the limitation level ascertained by the access level determination unit falls within the range of the limitation level for permitting the reading of data from the specific data storage locations, and a prohibition unit for prohibiting the reading of data from the plurality of data storage locations if the limitation level ascertained by the access level determination unit does not fall within any range of the limitation level for permitting the reading of data from each of the plurality of data storage locations.

A storage device according to the present invention, from which data is read out by an outside device may include: a memory unit comprising non-volatile memory; an access level storage unit for storing a concrete (e.g., a fixed) limitation for limiting read access to the memory unit in accordance with a state of the outside device; an access level determination unit for ascertaining the state of the outside device; and an access restriction unit for limiting read access to the memory unit in accordance with the state of the outside device ascertained by the access level determination unit and with the fixed limitation.

According to an aspect of the present invention, when the storage device is connected to an electronic device, the storage device ascertains the setting of the electronic device and executes processing for limiting the electronic device from reading out data from the storage device. By executing the processing of limiting data read-out at the storage device side, the electronic device does not have to execute special software.

According to another aspect of the present invention, the storage device permits the electronic device to read out data from the memory unit if the setting of the electronic device permits data read-out determined at the storage device. The storage device prohibits the electronic device from reading out data from the memory unit if the setting of the electronic device does not permit data read-out determined at the storage device.

According to another aspect of the present invention, the storage device prohibits an application of power to the memory unit and to data output circuitry that performs processing of reading out data, when it prohibits reading data. Prohibition of power makes it impossible to execute the processing for reading data, allowing reliable prohibition of data read-out.

According to another aspect of the present invention, the memory unit of the storage device includes a plurality of data storage portions or locations. A condition is determined for permitting data read-out from each of the data storage locations, to individually permit or prohibit data read-out from each data storage location in accordance with the setting for the electronic device. Accordingly, authorization for data read-out is set in multiple stages at the electronic device.

According to another aspect of the present invention, the storage device prohibits the application of power to the data storage location for which data read-out is to be prohibited, when data read-out from the data storage location is prohibited. The power supply is prohibited, making it impossible to execute the processing of reading out data, and thus reliably prohibiting data read-out.

According to a further aspect of the present invention, when connected to the electronic device, the storage device is connected to an access level setting unit of the electronic device with a signal line used for the interface performing data transmission and ascertains the setting of the electronic device through the signal line. Thus, the processing for limiting data read-out is executed by hardware.

The present invention prevents unidentified electronic devices from reading out data from the storage device, preventing unauthorized leakage of data. There is no need for executing special software at the electronic device and thus troublesome work can be avoided, easily preventing unauthorized leakage of data. Furthermore, necessary processing is executed at the storage device side, reducing limitations at the electronic device side such as limitations in OS requirements of the electronic equipment. The present invention therefore produces a beneficial effect.

The above and further objects and features of the invention will more fully he apparent from the following detailed description with accompanying drawings.

BRIEF DESCRIPTION OF THE SEVERAL VIEWS OF THE DRAWINGS

FIG. 5 is a conceptual view illustrating an example of limitation in data read-out in accordance with a limitation level;

FIG. 8 is a conceptual view illustrating an example of stored contents in a storage section of the storage device in Embodiment 2.

DETAILED DESCRIPTION

Embodiment 1

Figure 1:
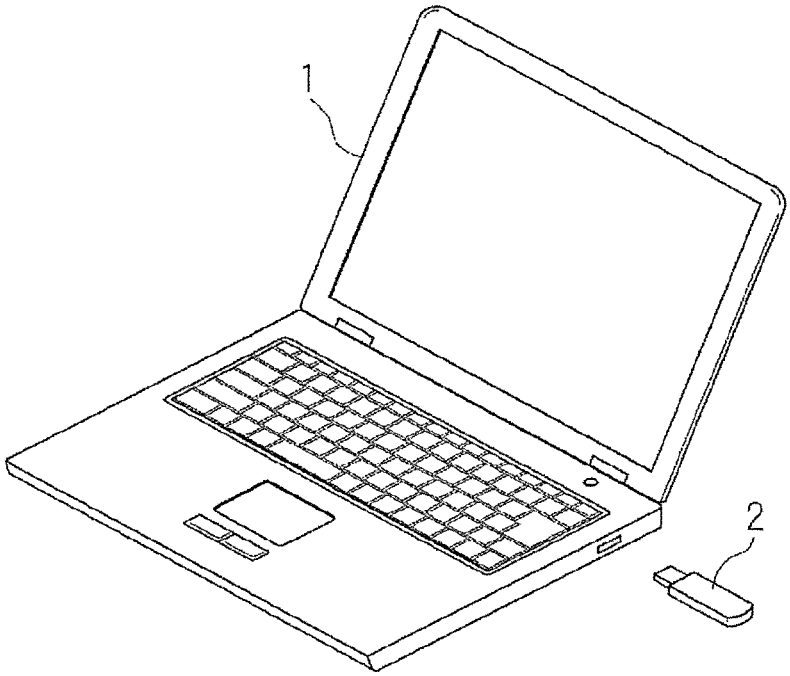
FIG. 1 is a conceptual view illustrating the appearance of an electronic system of the present invention.

FIG. 1 is a conceptual view illustrating the appearance of an electronic system of the present invention. The electronic system of the present invention includes electronic equipment 1, also referred to as an electronic device such as a notebook PC, a game machine or the like and a USB flash drive 2. The USB flash drive 2 is a storage device which can be attached or detached to/from the electronic device 1, and the electronic device 1 writes and reads data to/from the storage device when the device is connected thereto.

Figure 2:
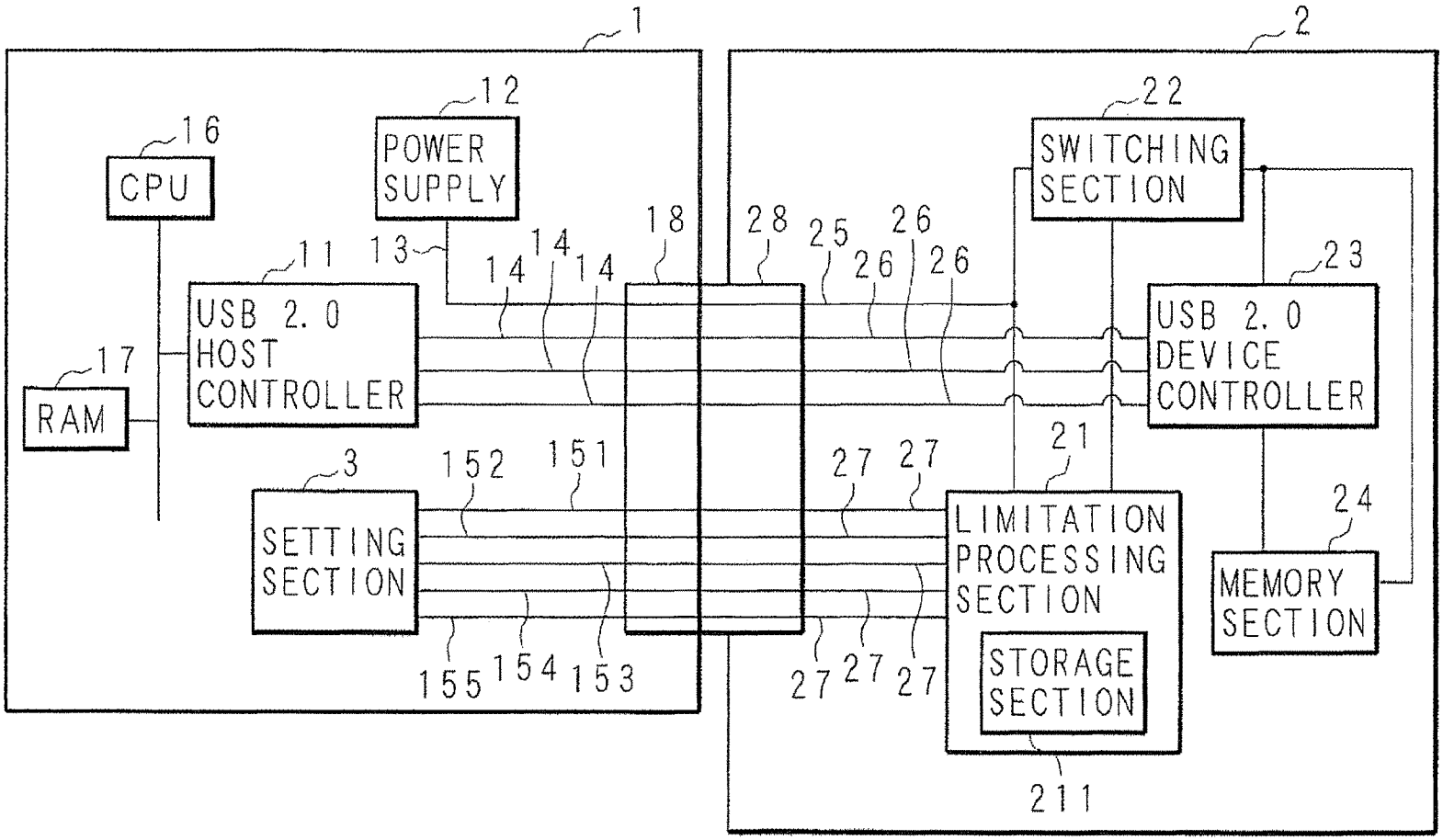
FIG. 2 is a block diagram illustrating the internal functional configuration of electronic equipment (e.g., an electronic device) and a USB flash drive included in the electronic system according to Embodiment 1.

FIG. 2 is a block diagram illustrating the internal functional configuration of the electronic device 1 and the USB flash drive 2 included in the electronic system according to Embodiment 1. The electronic device 1 includes a USB 3.0 socket 18 which is a connector for connecting the USB flash drive 2 thereto. The USB 3.0 socket 18 is a connector compliant with USB 3.0 which is an interface for inputting/outputting data. The USB 3.0 is an interface for inputting/outputting data using nine signal lines. Nine signal lines are connected to the USB 3.0 socket 18.

Moreover, USB 3.0 has backward compatibility with USB 2.0. The USB 2.0 is an interface for inputting/outputting data using four signal lines. Among nine signal lines connected to the USB 3.0 socket 18, four signal lines are used for USB 2.0. The four signal lines used for USB 2.0 include a power line 13 as well as three signal lines 14, 14 and 14. Furthermore, the nine signal lines connected to the USB 3.0 socket 18 include five signal lines 151, 152, 153, 154 and 155 that are not used for USB 2.0.

The power line 13 is connected to a power supply 12 which supplies power to the USB flash drive 2 connected to the USB 3.0 socket 18. The signal lines 14, 14 and 14 are connected to the USB 2.0 host controller 11. The USB 2.0 host controller 11 executes processing of data input/output at the host side in accordance with a communication protocol for USB 2.0. The electronic device 1 further includes a setting section 3. The setting section is also referred to herein as an access level setting unit. The access level setting unit operates to set, in advance, a limitation level indicating the level of limiting data read-out from the USB flash drive 2. The access level setting unit 3 is connected to signal lines 151, 152, 153, 154 and 155. Details of the access level setting unit 3 will be described later. The USB 2.0 host controller 11 is connected to a CPU (Central Processing Unit) 16 which executes information processing required for the electronic device 1. The CPU 16 is connected to a RAM (Random Access Memory) which stores data generated along with the information processing. The CPU 16 is additionally connected to various devices (not shown), such as a display, for executing various types of processing required for the electronic device 1.

The USB flash drive 2 includes a USB 3.0 plug 28 which is a connector for connecting the USB 3.0 socket 18 thereto. The USB 3.0 plug 28 is a connector compliant with USB 3.0 and is connected to nine signal lines. Among the nine signal lines, four signal lines used for USB 2.0 include a power line 25 as well as three signal lines 26, 26 and 26. Moreover, the nine signal lines connected to the USB 3.0 plug 28 include five signal lines 27, 27, . . . that are not used for USB 2.0. The USB flash drive 2 includes a USB 2.0 device controller 23 executing processing of data input/output on the device side in accordance with the communication protocol for USB 2.0. The USB 2.0 device controller 23 corresponds to a data output unit or circuit in the present invention. The USB 2.0 device controller 23 is connected to the signal lines 26, 26 and 26. Furthermore, the USB 2.0 device controller 23 is connected to a memory unit 24 which is a non-volatile semiconductor memory such as a flash memory.

The USB flash drive 2 further includes a limitation processing section 21. The limitation processing section 21, also sometimes referred to as an access control unit or an access level determination circuit, performs the process of limiting the operation of the USB 2.0 device controller 23 and memory unit 24 in accordance with the limitation level set at the setting section 3. The limitation processing section 21 is configured with a microcontroller including a processor and a memory for storing a program required for operation and temporary information associated with the operation as well as an input terminal and an output terminal for signals. The limitation processing section 21 includes a storage section 211, also referred to as an access level storage unit, which stores a concrete (e.g., fixed) limitation for permitting or prohibiting a data read-out from the memory unit 24 in accordance with a limitation level. The input terminal of the limitation processing section 21 is connected to five signal lines 27, 27, . . . . Note that the limitation processing section 21 may be configured as a PLD (Programmable Logic Device) or a general-purpose logic IC. The limitation processing section 21 may also be configured with plural ICs.

In addition, the limitation processing section 21 is connected to the power line 25. The limitation processing section 21 is supplied with power from the electronic device 1 through the power line 25. Furthermore, the power line 25 is connected to a switching circuit 22 for switching between supplying and cutting of the power for the USB 2.0 device controller 23 and the memory unit 24. The switching circuit 22 is connected to the USB 2.0 device controller 23 and memory 24 by the power line. The switching circuit 22 performs processing for switching between supplying and cutting of the power supplied through the power line 25 to the USB 2.0 device controller 23 and memory 24. The switching circuit 22 corresponds to a second power supply in the present invention. The switching circuit 22 is configured with, for example, a FET (Field Effect Transistor). The power is supplied to the USB 2.0 device controller 23 and memory 24 when FET is turned on, while the power is cut off therefrom when FET is turned off. The switching circuit 22 is connected to the limitation processing section 21 through the signal line, the limitation processing section 21 controlling the operation of the switching circuit 22.

Figure 3:
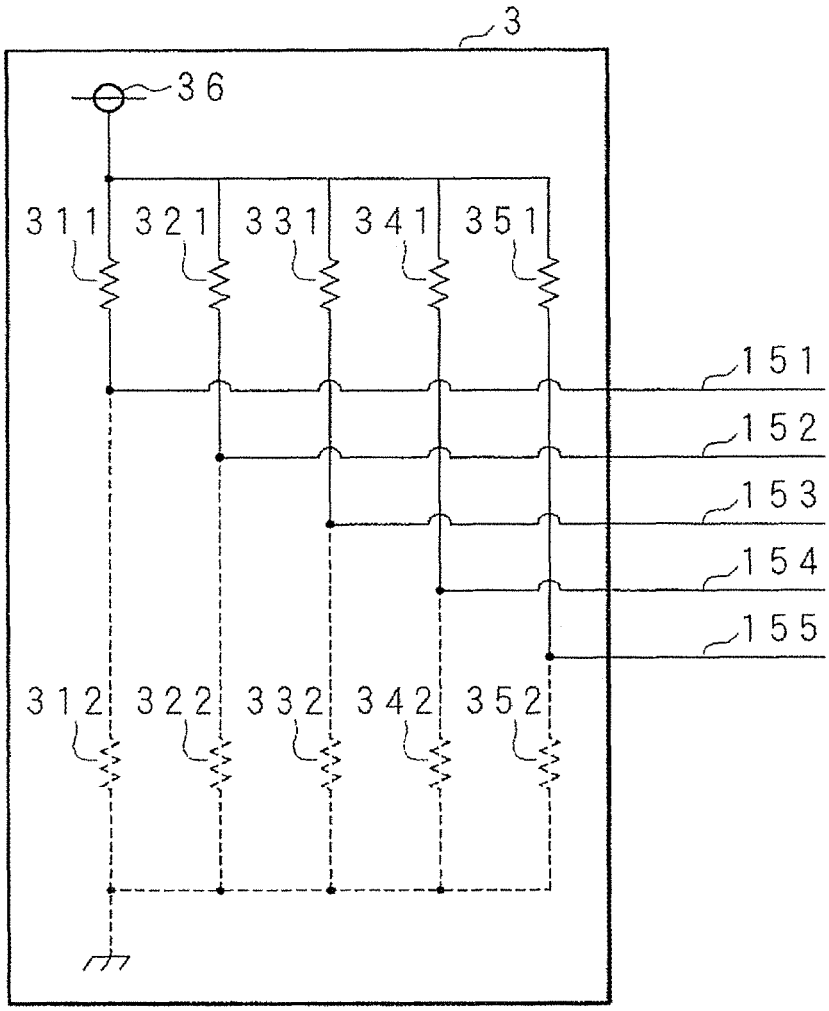
FIG. 3 is a circuit diagram illustrating the first example of the internal configuration of a setting section of the electronic device, also sometimes referred to as an access level setting unit.

FIG. 3 is a circuit diagram illustrating the first example of the internal configuration of the setting section 3 (access level setting unit of the electronic device 1). The setting section 3 includes a constant potential point 36 connected to a power supply (not shown). The setting section 3 includes either a pull-up resistance 311 connected to the constant potential point 36 or a pull-down resistance 312 connected to the ground. A signal line 151 is connected to either pull-up resistance 311 or pull-down resistance 312. In the state where the signal line 151 is connected to the pull-up resistance 311, the potential of the signal line 151 becomes high. On the other hand, when the signal line 151 is connected to the pull-down resistance 312, the potential of the signal line 151 becomes low. The high potential is assumed as a signal of "1" whereas the low potential is assumed as a signal of "0." In other words, the signal line 151 outputs "1" when it is connected to the pull-up resistance 311, whereas the signal line 151 outputs "0" when it is connected to the pull-down resistance 312.

Likewise, the setting section 3 includes either a pull-up resistance 321 or a pull-down resistance 322. A signal line 152 is connected to either pull-up resistance 321 or pull-down resistance 322. The setting section 3 also includes either a pull-up resistance 331 or a pull-down resistance 332. A signal line 153 is connected to either pull-up resistance 331 or pull-down resistance 332. The setting section 3 further includes either a pull-up resistance 341 or a pull-down resistance 342. A signal line 154 is connected to either pull-up resistance 341 or pull-down resistance 342. Moreover, the setting section 3 includes either a pull-up resistance 351 or a pull-down resistance 352. A signal line 155 is connected to either pull-up resistance 351 or pull-down resistance 352.

When the pull-up resistances 311, 321, 331, 341 and 351 indicated by solid lines in FIG. 3 are connected, the signal lines 151, 152, 153, 154 and 155 output {1, 1, 1, 1, 1}. If, on the other hand, the pull-down resistances 312, 322, 332, 342 and 352 are connected, the signal lines 151, 152, 153, 154 and 155 output {0, 0, 0, 0, 0}. By connecting either the pull-up resistances or pull-down resistances to the respective signal lines, the setting section 3 is set to output any one of the $2^5$ signals from {0, 0, 0, 0, 0} to {1, 1, 1, 1, 1}. The signal output by the setting section 3 indicates the limitation level. The setting section 3 has an internal circuit determined in advance to output a signal indicating a predetermined limitation level.

Figure 4:
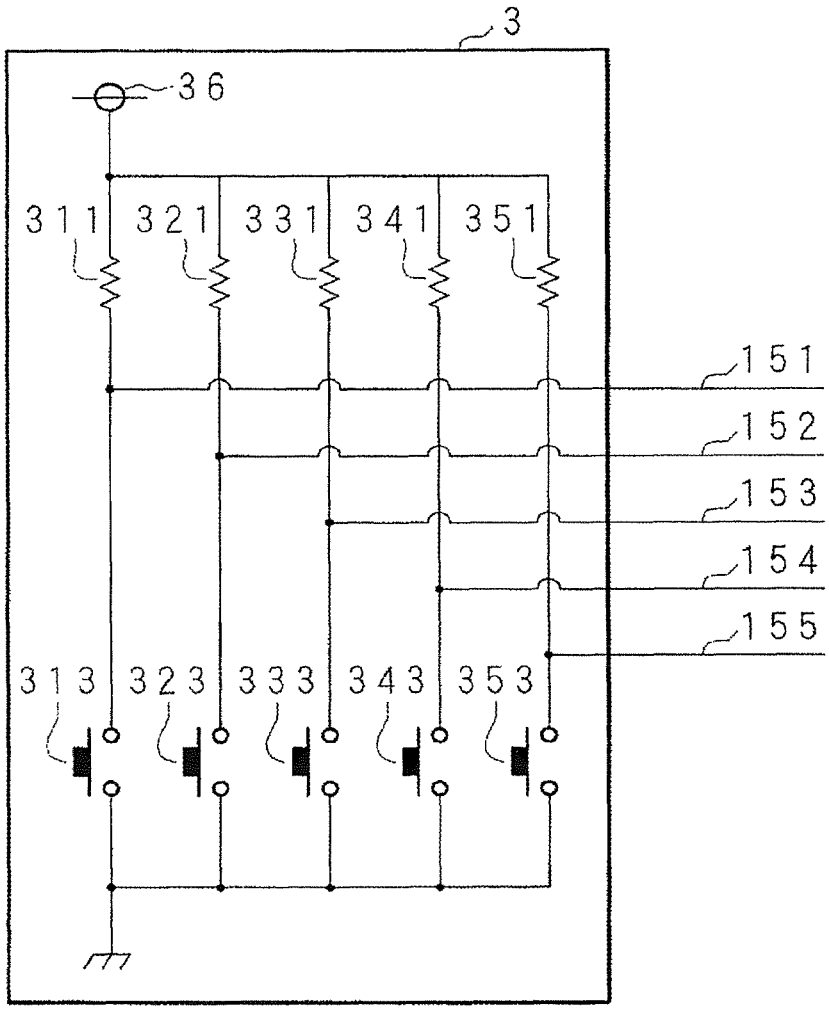
FIG. 4 is a circuit diagram illustrating the second example of the internal configuration of the setting section of the electronic device.

FIG. 4 is a circuit diagram illustrating the second example of the internal configuration of the setting section 3. The setting section 3 includes the pull-up resistance 311 and a pull-down switch 313, which are connected to the signal line 151. As shown in FIG. 4, when the pull-down switch 313 is turned off, the potential of the signal line 151 becomes high, outputting "1." When, on the other hand, the pull-down switch 313 is turned on, the potential of the signal line 151 becomes low, outputting "0." Similarly, the setting section 3 includes pull-up resistances 321, 331, 341 and 351 as well as pull-down switches 323, 333, 343 and 353. The signal line 152 is connected to the pull-up resistance 321 and pull-down switch 323. The signal line 153 is connected to the pull-up resistance 331 and pull-down switch 333. The signal line 154 is connected to the pull-up resistance 341 and pull-down switch 343. The signal line 155 is connected to the pull-up resistance 351 and pull-down switch 353.

By switching "on" and "off" of each of the pull-down switches 313, 323, 333, 343 and 353, the setting section 3 is set to output any one of the $2^5$ signals from {0, 0, 0, 0, 0} to {1, 1, 1, 1, 1}. If, for example, all of the pull-down switches 313, 323, 333, 343 and 353 are turned off as shown in FIG. 4, the signals of {1, 1, 1, 1, 1} are output. In other words, at the setting section 3, the limitation level is determined in accordance with whether each of the pull-down switches 313, 323, 333, 343 and 353 are "on" or "off." The setting section 3 is set in advance to output a signal indicating a predetermined limitation level. Note that the setting section 3 may have a configuration in which each pull-down switch is so fixed as not to change the limitation level, or a configuration in which the limitation level can be changed by switching "on" and "off" of each pull-down switch using a DIP switch or the like.

Though FIGS. 3 and 4 show the examples where all of the five signal lines 151, 152. 153, 154 and 155 are used to output a signal of a limitation level, the setting section 3 may alternatively take a form of outputting a signal of the limitation level using a part of the signal lines. The setting section 3 may, for example, use only the signal line 151 to output "0" or "1." The setting section 3 may also be configured with a non-volatile memory in which digital data indicating the limitation level is stored. The setting section 3 with such a configuration has the limitation level set by storing specific digital data, and the limitation level is read out through any one of the signal lines 151, 152, 153, 154 and 155. This configuration allows more variations of limitation levels than $2^5$ levels to be set. The setting section 3 may also have a configuration in which digital data indicating the limitation level can or cannot be rewritten.

The USB 3.0 plug 28 is connected to the USB 3.0 socket 18, so that the electronic device 1 is connected to the USB flash drive 2. In the state where the electronic device 1 is connected to the USB flash drive 2, the USB 2.0 host controller 11 is connected to the USB 2.0 device controller 23 through the signal lines 14, 14, 14 and the signal lines 26, 26, 26. Moreover, the limitation processing section 21 is connected to the setting section 3 through the signal lines 151, 152, 153, 154, 155 and signal lines 27, 27, . . . . Furthermore, electric power is supplied from the power supply 12 to the limitation processing section 21 and the switching circuit 22 through the power lines 13 and 25.

FIG. 5 is a conceptual view illustrating an example of how data read-out operations are permitted or prohibited in accordance with a limitation level. The storage section 211 (e.g., the access level storage unit of the storage device 2) stores therein information indicating the range of limitation levels which permits the electronic device 1 to read out data from the memory 24. In the example shown in FIG. 5, when the signals indicating the limitation level correspond to {1, 1, 1, 1, 1}, reading data is permitted. When the signals indicating the limitation level corresponds to a combination other than {1, 1, 1, 1, 1}, reading data is prohibited. In the configuration where the setting section 3 is formed with a non-volatile memory, the storage section 211, for example, stores specific data for the limitation level at which the electronic equipment 1 is permitted to read out data from the memory section 24.

Figure 6:
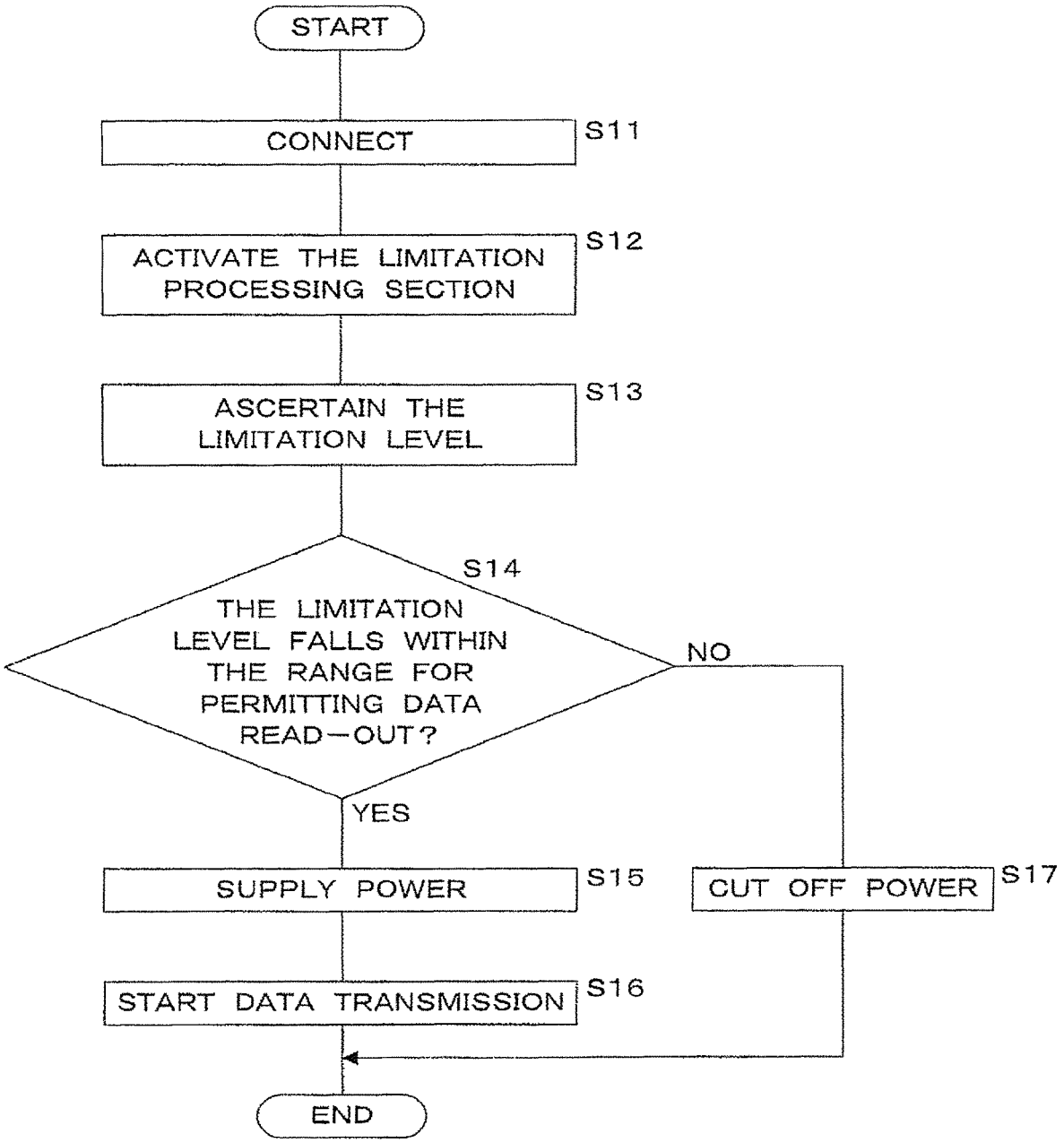
FIG. 6 is a flowchart illustrating the procedure of processing performed when the USB flash drive is connected to the electronic device in Embodiment 1.

FIG. 6 is a flowchart illustrating the procedure of processing performed when the USB flash drive 2 is connected to the electronic equipment 1 in Embodiment 1. The USB 3.0 plug 28 is connected to the USB 3.0 socket 18, so that the electronic device 1 is connected to the USB flash drive 2 (S11). The electric power from the power supply 12 is supplied through the power lines 18 and 25 to the limitation processing section 21, to activate the limitation processing section 21 (S12). The limitation processing section 21 accepts signals indicating the limitation level by detecting the potential of each of the connected signal lines 27, 27, . . . , to ascertain the limitation level set at the setting section (S13). Note that, in the configuration where the setting section 3 corresponds to a non-volatile memory storing digital data, the limitation processing section 21 reads out data indicating the limitation level from the setting section 3 at step S13, to ascertain the set limitation level. The limitation processing section 21 subsequently refers to the stored contents in the storage section 211 and determines whether or not the ascertained limitation level falls within the range for permitting data read-out from the memory section 24 (S14).

If, for example, the storage section 211 stores the condition shown in FIG. 5 and the signals indicating the limitation level are {1, 1, 1, 1, 1}, the limitation processing section 21 determines that the ascertained limitation level falls within a range which permits the data to be read out from the memory unit 24. Moreover, if the signals indicating the limitation level is other than {1, 1, 1, 1, 1 } such as {0, 0, 0, 0, 0} for example, the limitation processing section 21 determines that the ascertained limitation level does not fall within the range which permits the data to be read out from the memory unit 24. Moreover, also when the signal accepted at step S13 is an unidentified signal, the limitation processing section 21 determines that the ascertained limitation level does not fall within the range which permits the data to be read out from the memory unit 24. Furthermore, in the case where the setting section 3 is configured with a non-volatile memory, the limitation processing section 21 determines that the limitation level falls within the range which permits data to be read out from the memory unit 24 when the ascertained limitation level matches the limitation level stored in the storage section 211. In the configuration, the limitation processing section 21 determines that the limitation level does not fall within the range which permits the data to be read out when the ascertained limitation level does not match the limitation level stored in the storage section 211.

If, at step S14, the limitation level falls within the range which permits the data to be read out (S14: YES), the limitation processing section 21 makes the switching section 22 supply the electric power from the power supply 12 to the USB 2.0 device controller 23 and memory section 24 (S15). More specifically, the limitation processing section 21 sets the switching section 22 configured with FET switch to the "on" state.

The electric power is supplied to the USB 2.0 device controller 23 and memory section 24, enabling data to be input/output to/from the memory section 24. Accordingly, the electronic equipment 1 is permitted to read out data from the memory section 24. The USB 2.0 host controller 11 and USB 2.0 device controller 23 subsequently starts data transmission in accordance with USB 2.0 between the electronic equipment 1 and USB flash drive 2 through the signal lines 14, 14, 14 and the signal lines 26, 26, 26 (S16). More specifically, data is read out from the memory section 24. The electronic equipment 1 and USB flash drive 2 then terminate the processing performed when they are connected to each other.

If, at step S14, the limitation level does not fall within the range which permits data to be read out (S14: NO), the limitation processing section 21 makes the switching section 22 cut off the electric power supplied from the power supply 12 to the USB 2.0 device controller 23 and memory section 24 (S17). More specifically, the limitation processing section 21 sets the switching section 22 configured with FET switch to the "off" state. The electric power is not supplied to the USB 2.0 device controller 23 and memory section 24, disabling the operation of the USB 2.0 device controller 23 and memory section 24. Thus, data read-out from the memory section 24 by the electronic device 1 is prohibited. Thereafter, the CPU 16 may perform processing of notifying the user of prohibition of data read-out by, for example, showing an image indicating that data transmission with the USB flash drive 2 is not possible on a display (not shown). The electronic device 1 and USB flash drive 2 then terminates the processing performed when they are connected with each other.

As specifically described above, in the present embodiment, the processing of limiting the electronic device 1 in reading out data from the USB flash drive 2 is executed at the side of USB flash drive 2 based on the setting of the electronic device 1. Data read-out is prohibited when the setting at the electronic device 1 does not match with the condition for permitting data read-out that has been determined for the USB flash drive 2, preventing data to be read out from the USB flash drive 2 by unidentified electronic equipment and thus preventing unauthorized data leakage. As the processing for limiting data read-out is executed at the side of USB flash drive 2, it is not necessary for the electronic device 1 to execute any special software and thus troublesome work is avoided. This can, therefore, easily prevent unauthorized leakage of data. Furthermore, because the processing is executed at the side of the USB flash drive 2, the limitation of, for example, OS in the electronic device 1 can be reduced. This further reduces disturbance in using the present invention, allowing the invention to be applied to a number of electronic equipment systems and thus reliably reducing unauthorized leakage of data.

According to the present embodiment, when data reading is prohibited, power is stopped being supplied to the USB 2.0 device controller 23 and the memory 24. This makes it impossible to read out data, reliably prohibiting data read-out. Moreover, in the present embodiment, the USB flash drive 2 ascertains, when it is connected to the electronic device 1, the limitation level set at the electronic device 1 through signal lines 27, 27, . . . , and executes the processing for limiting data read-out by hardware. Since the process of limiting data read-out is surely executed when the USB flash drive 2 is connected to the electronic device 1, the present invention has an enhanced security compared to the technique that limits data read-out by software.

Embodiment 2

Figure 7:
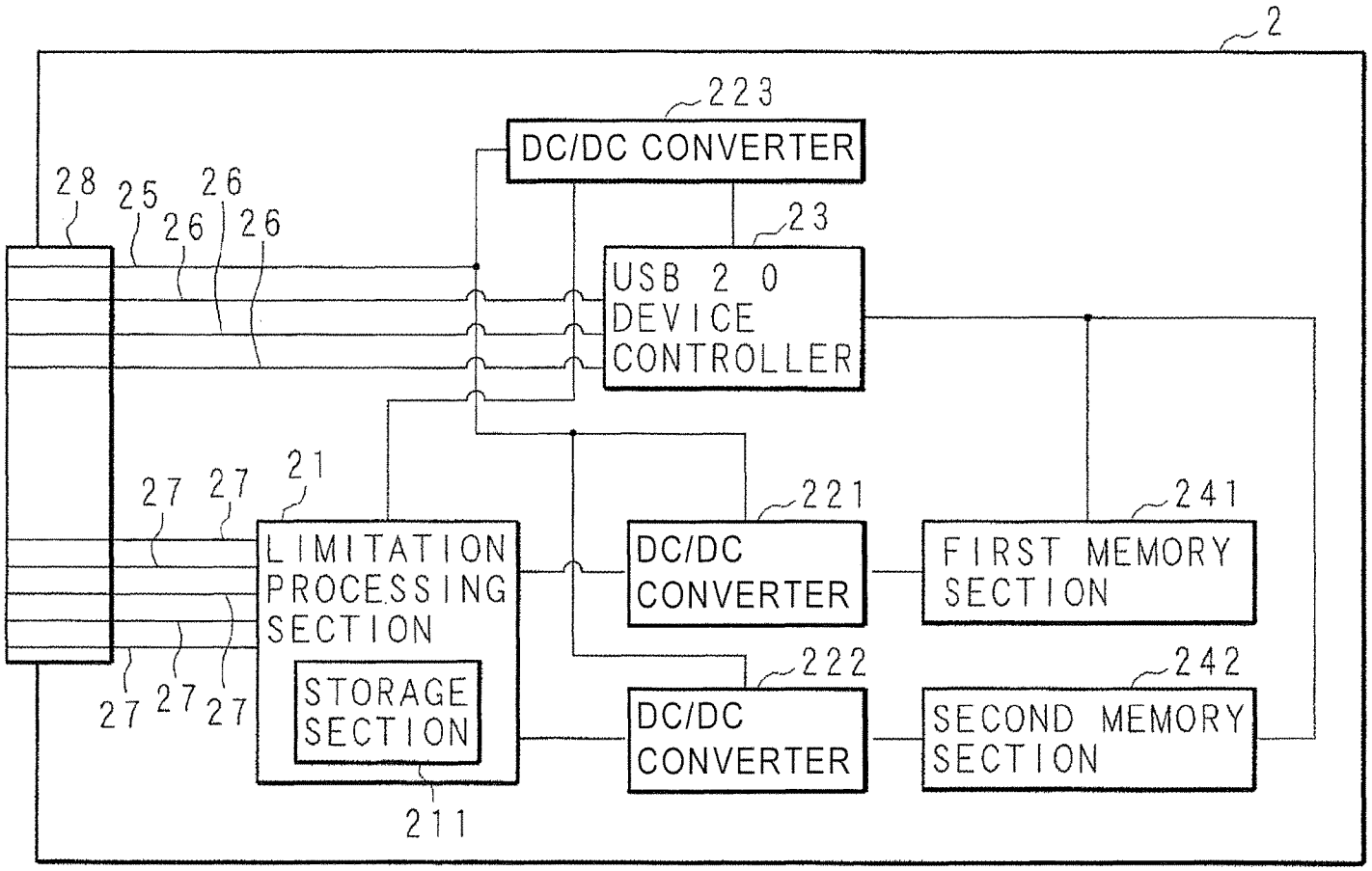
FIG. 7 is a block diagram illustrating the internal functional configuration of a USB flash drive included in an electronic system according to Embodiment 2.

FIG. 7 is a block diagram illustrating the internal functional configuration of the USB flash drive 2 included in an electronic system according to Embodiment 2. The internal functional configuration of the electronic device 1 is similar to that in Embodiment 1. The USB flash drive 2 includes a memory having two memory portions or locations referred to as a first memory portion 241 and second memory portion 242 as data storing sections in the present invention. Each of the first memory portion 241 and the second memory portion 242 corresponds to a non-volatile memory such as a flash memory or the like. The first memory portion 241 and the second memory portion 242 are connected to the USB 2.0 device controller 23 and are also referred to as a first non-volatile memory and a second non-volatile memory.

The power line 25 is connected to DC/DC converters 221, 222 and 223 for converting the direct-current voltage of power supplied through the power line 25. The USB 2.0 device controller 23 is connected to the DC/DC converter 223 and is supplied power from the DC/DC converter 223. The first memory section 241 is connected to the DC/DC converter 221 and is supplied power from the DC/DC converter 221. The second memory section 242 is connected to the DC/DC converter 222 and is supplied power from the DC/DC converter 222. The DC/DC converters 221, 222 and 223 are in a halt state when the USB flash drive 2 is not connected to the electronic equipment 1. Each of the DC/DC converters 221, 222 and 223 is connected to the limitation processing section 21, which controls the operation of each of the DC/DC converters 221, 222 and 223. As the other functional configurations of the USB flash drive 2 are similar to those in Embodiment 1, the corresponding parts are denoted by the same reference codes and will not be described here in detail.

FIG. 8 is a conceptual view illustrating an example of contents stored in the storage section 211 in Embodiment 2, showing a range of limitation level for permitting data read-out from each of the first memory portion 241 and the second memory portion 242. Stored in the storage section 211 is information indicating the range of limitation level for permitting the electronic equipment 1 to read out data from the first memory portion 241 and the second memory portion 242. In the example shown in FIG. 8, if the signals indicating the limitation level correspond to {1, 1, 1, 1, 1}, data reading is permitted from both of the first memory portion 241 and the second memory portion 242. If the signals indicating the limitation level are in the range between {1, 1, 1, 1, 0} and {0, 1, 1, 1, 1}, data reading is permitted only from the first memory section 241. If the signals indicating the limitation level are in the range between {1, 1, 1, 0, 0} and {0, 1, 1, 1, 0}, data reading is permitted only from the second memory portion 242. If the signals indicating the limitation level correspond to other signals, data reading is prohibited both from the first memory portion 241 and from the second memory portion 242. Moreover, in the case where the setting section 3 is configured with a non-volatile memory, the storage section 211 stores, for example, specific data regarding the limitation level for permitting the electronic device 1 to read out data from each of the first memory portion 241 and the second memory portion 242.

Figure 9:
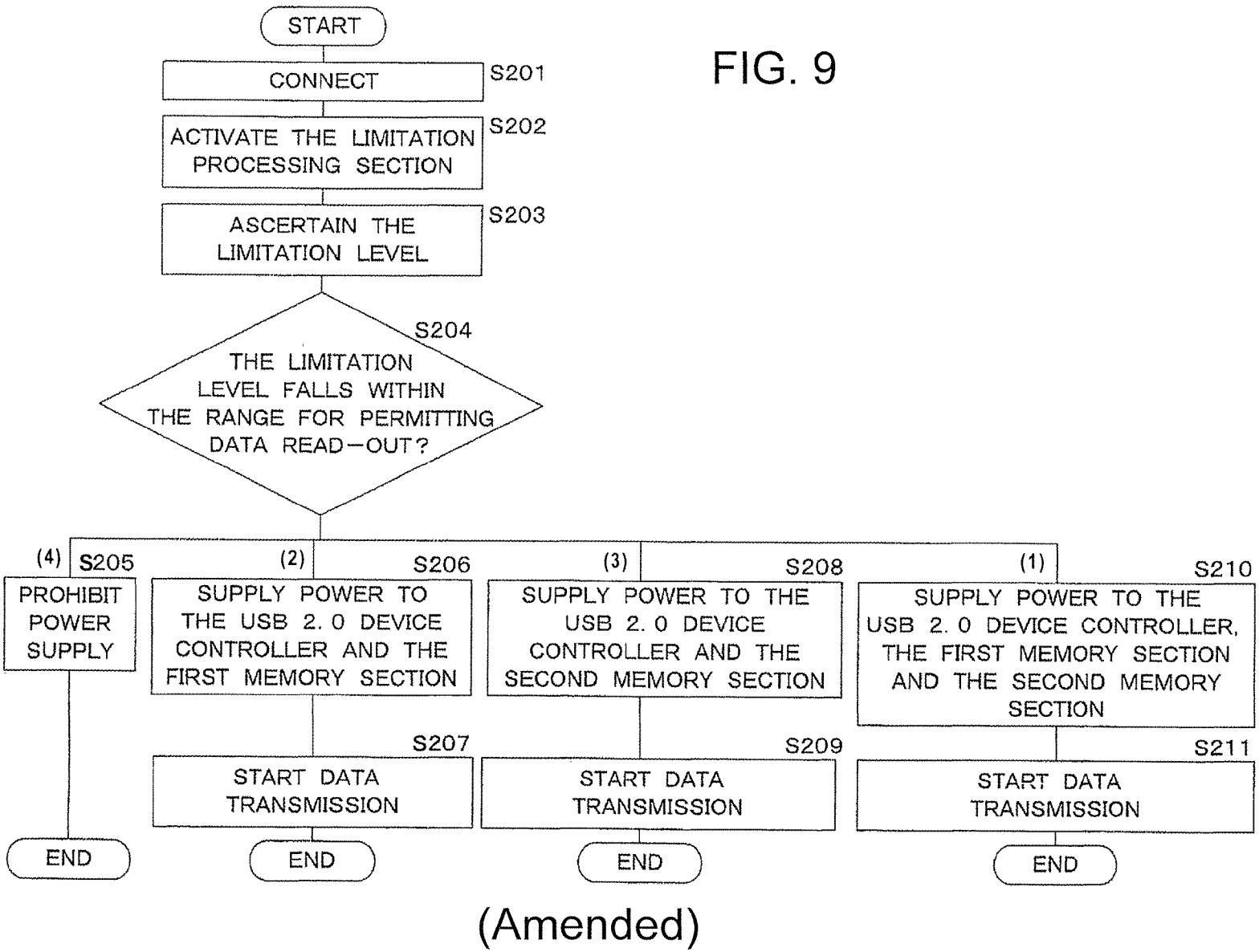
FIG. 9 is a flowchart illustrating the procedure of processing performed when a USB flash drive is connected to the electronic device in Embodiment 2.

FIG. 9 is a flowchart illustrating the processing performed when the USB flash drive 2 is connected to the electronic device 1 in Embodiment 2. The USB flash drive 2 is connected to the electronic device 1 (S201). Power is supplied from the power supply 12 to the limitation processing section 21 to activate the limitation processing section 21 (S202). The limitation processing section 21 ascertains the limitation level set at the setting section 3 through the connected signal lines 27, 27, . . . (S203). The limitation processing section 21 subsequently refers to the contents stored in the storage section 211 to determine whether or not the ascertained limitation level falls within the range for permitting data read-out from either the first memory section 241 or the second memory section 242 (S204).

At step S204, if the ascertained limitation level does not fall in any range for permitting data read-out from each of the memory sections, the limitation processing section 21 stops the DC/DC converter 223 to prohibit power supply to the USB 2.0 device controller 23 (S205). The USB 2.0 device controller 23 performing data transmission is inactivated, prohibiting the electronic device 1 from reading out data from the first memory section 241 and the second memory section 242. Thereafter, the CPU 16 may perform the processing of notifying the user that data read-out is prohibited. This terminates the processing performed when the electronic device 1 is connected to the USB flash drive 2.

At step S204, if the ascertained limitation level falls within the range for permitting data read-out from the first memory 241, the limitation processing section 21 performs processing for supplying electric power to the USB 2.0 device controller 23 and the first memory 241 (S206). More specifically, the limitation processing section 21 activates the DC/DC converter 223 and the DC/DC converter 221, and stops the DC/DC converter 222. Electric power is supplied to the USB 2.0 device controller 23 and the first memory 241, to allow the first memory 241 to be accessed. This permits data stored in the first memory 241 to be read out. Furthermore, the second memory 242 cannot be accessed because no power is supplied to the second memory 242. This prohibits reading data stored in the second memory 242. The USB 2.0 host controller 11 and the USB 2.0 device controller 23 then start data transmission in accordance with USB 2.0 between the electronic equipment 1 and the USB flash drive 2 (S207). More specifically, data is read out from the first memory 241. This terminates the processing performed when the electronic equipment 1 is connected to the USB flash drive 2.

At step S204, if the ascertained limitation level falls within the range for permitting data read-out from the second memory 242, the limitation processing section 21 performs processing for supplying power to the USB 2.0 device controller 23 and the second memory section 242 (S208). More specifically, the limitation processing section 21 activates the DC/DC converter 223 and the DC/DC converter 222, and stops the DC/DC converter 221. Electric power is supplied to the USB 2.0 device controller 23 and the second memory 242 to allow the second memory 242 to he accessed. This permits data stored in the second memory 242 to be read out. Furthermore, the first memory 241 cannot be accessed because no power is supplied to the first memory 241. This prohibits reading data stored in the first memory 241. The USB 2.0 host controller 11 and the USB 2.0 device controller 23 subsequently start data transmission in accordance with USB 2.0 between the electronic device 1 and the USB flash drive 2 (S209). More specifically, data is read out from the second memory section 242. This terminates the processing performed when the electronic device 1 is connected to the USB flash drive 2.

At step S204, if the ascertained limitation level falls in the range for permitting data read-out from all the memory sections, the limitation processing section 21 performs processing for supplying power to the USB 2.0 device controller 23, the first memory 241 and the second memory 242 (S210). More specifically, the limitation processing section 21 activates the DC/DC converters 221, 222 and 223. Electric power is supplied to the USB 2.0 device controller 23, the first memory 241 and the second memory 242, to allow the first memory 241 and the second memory 242 to be accessed. This permits the data stored in the first memory 241 and the second memory 242 to be read out. The USB 2.0 host controller 11 and the USB 2.0 device controller 23 subsequently start data transmission in accordance with USB 2.0 between the electronic equipment 1 and the USB flash drive 2 (S211). More specifically, data is read out from the first memory 241 and the second memory 242. This terminates the processing performed when the electronic device 1 is connected to the USB flash drive 2.

As has been described above, in the present embodiment, the USB flash drive 2 includes plural memory sections and individually limits data read-out from each memory section based on the setting for the electronic device 1. This can prevent unauthorized electronic equipment from reading out data from the USB flash drive 2, while also limiting in multiple stages legitimate electronic device 1 regarding its authorization for reading out data. For example, in a business institution, the range of data to be read out from the USB flash drive 2 can be differentiated between the electronic device 1 used by a general employee and that used by a manager, to prevent unauthorized leakage of data in the business institution. Also in the present embodiment, power is individually stopped supplying to each memory section when data read-out from each memory section is prohibited, reliably prohibiting data read-out from each memory section.

Though the present embodiment showed the configuration where the USB flash drive 2 includes the first memory 241 and the second memory 242, it may also be possible that the USB flash drive 2 includes three or more memory sections, each of which is limited by the limitation processing section 21 for data read-out. Moreover, though Embodiments 1 and 2 showed the configuration where power supplied to the memory section is cut off in order to prohibit data read-out from the memory section, the present invention may also employ another method to prohibit data read-out from the memory section. For example, the USB flash drive 2 may have a configuration in that data can be written to the memory section while data cannot be read out from the memory section, when data read-out from the memory section is prohibited. Furthermore, though Embodiments 1 and 2 described above illustrated the storage device of the present invention as a USB flash drive, it may also be a hard disk drive. Moreover, through Embodiments 1 and 2 described above illustrated the configuration where the electronic equipment and the storage device are connected via USB 3.0 while data transmission between them is performed in accordance with USB 2.0, the present invention may also utilize an interface other than USB 2.0 and USB 3.0.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic [equipment] system, comprising;

an electronic [equipment] *device*; and a storage device *configured* to be connected to the electronic [equipment which reads data from the storage device] *device and having a memory unit*, wherein the electronic [equipment] *device* includes

[a] *an access level* setting [section having set a limitation] *unit for setting and storing an access* level [on reading out data from] *for limiting read access to the memory unit of* the storage device *by the electronic device, wherein the access level setting unit sets the access level prior to connection of the storage device to the electronic device*, and the storage device includes

[a limitation storage section for storing one or more values of a limitation level for permitting reading data,]

an [ascertainment section for ascertaining the limitation] *access level determination circuit configured to determine the access* level set [at the] *by the access level* setting [section when] *unit responsive to connection of* the storage device [is connected] to the electronic [equipment, and a limitation section for limiting] *device, wherein the access level determination circuit selectively controls the* reading *of* data [in accordance with the limitation level ascertained by the ascertainment section and the one or more values stored by the limitation storage section] *from the memory unit in accordance with the determined access level by selectively connecting a source of electrical power to or removing the source of electrical power from at least the memory unit of the storage device*.

2. The electronic [equipment] system according to claim 1, wherein the [limitation section] *access level determination circuit* includes a permission [section] *unit* for permitting reading data if the [limitation] *access* level ascertained by the [ascertainment section] *access level determination circuit* is consistent with the one or more values, and a prohibition [section] *unit* for prohibiting reading data if the [limitation] *access* level ascertained by the [ascertainment section] *access level determination circuit* is not consistent with the one or more values.

3. The electronic [equipment] system according to claim 2, wherein the electronic [equipment] *device* further includes a first power supply [section] for supplying electric power to the storage device connected to the electronic [equipment] *device*, the storage device further includes, a data output [section for reading out data and outputting] *unit configured to read and output* the data to the electronic [equipment] *device*, and a second power supply [section] that is connected to the first power supply [section] when the storage device is connected to the electronic [equipment] *device*, for supplying electric power from the first power supply [section] to the data output [section] *unit*, wherein the data output [section] *unit* is operated by electric power supplied from the second power supply [section], and the second power supply [section] switches between supplying and cutting of electric power to the data output [section] *unit*, the permission [section] *unit* makes the second power supply [section] supply electric power to the data output [section] *unit* if the [limitation level ascertained by the ascertainment section] *access level* is consistent with the one or more values, thereby allowing the data output section to read out data, and the prohibition [section] *unit* makes the second power supply [section] cut power to the data output [section] *unit* if the [limitation level ascertained by the ascertainment section] *access level* is not consistent with the one or more values, thereby not allowing the data output [section] *unit* to read out data.

4. The electronic [equipment] system according to claim 1, wherein the *memory unit of the* storage device [further] includes a plurality of data storage [sections] *portions*, the [limitation storage section] *access level determination circuit* stores [some values of a limitation level for permitting reading data from] *access levels for* each of the plurality of data storage [sections] *portions*, and the [limitation section] *access level determination circuit* includes a permission [section] *unit* for permitting reading data from one or more specific data storage [sections] *portions* included in the plurality of data storage [sections] *portions* and for prohibiting reading data from other data storage [sections] *portions* which are not included in the one or more specific data storage [sections] *portions* among the plurality of data storage [sections] *portions* if the [limitation level ascertained by the ascertainment section is consistent with the one or more values of the limitation level for permitting] *access levels permit* reading data from the specific data storage [sections] *portions*, and a prohibition [section] *unit* for prohibiting reading data from the plurality of data storage [sections] *portions* if the [limitation level ascertained by the ascertainment section is not consistent with the one or more values of the limitation level for permitting] *access levels do not permit* reading data from each of the plurality of data storage [sections] *portions*.

5. A storage device from which data is read out by *an* external [equipment] *device*, comprising:

*a non-volatile memory;* an [ascertainment section] *access level determination unit* for ascertaining [a limitation] *an access* level set at the external [equipment] *device*;

[a limitation] *an access level* storage [section] *unit* for storing one or more [values of a limitation level for permitting reading data] *ranges of access levels*; and

[a limitation section] *an access restriction unit* for limiting [reading data in accordance with the limitation level ascertained by the ascertainment section and the one or more values stored by the limitation storage section] *read access to the non-volatile memory by the external device responsive to the access level ascertained by the access level determination unit and the one or more ranges of access levels stored by the access level storage unit by selectively applying or removing electrical power to or from the non-volatile memory.*

*6. An electronic system, comprising:*

*an electronic device; and*

*a storage device configured to be removably connected to the electronic device, the storage device comprising a controller circuit and a non-volatile memory;*

*wherein the electronic device comprises an access level setting unit configured to establish an access level for the non-volatile memory of the storage device, the*

*access level established by the access level setting unit set prior to connection of the storage device to the electronic device, and*

*wherein the storage device further comprises an access level determination circuit configured to selectively apply or remove electrical power to or from the controller circuit and the non-volatile memory responsive to the access level established by the access level setting unit.*

*7. A method comprising:*

*coupling a storage device to an external device via an interface that facilitates a flow of electrical power from the external device to the storage device;*

*using the storage device to detect an access level, the access level established by the external device prior to the coupling step; and*

*activating a switching circuit of the storage device to prevent the flow of electrical power to a non-volatile memory of the storage device responsive to the access level detected by the storage device having a first selected value.*

*8. The method of claim 7, further comprising using the switching circuit of the storage device to allow the flow of electrical power to the non-volatile memory of the storage device responsive to the access level detected by the storage device having a different, second selected value.*

*9. The method of claim 7, wherein the activating step further comprises further preventing the flow of electrical power to a programmable processor of the storage device responsive to the access level detected by the storage device having the first selected value.*

*10. A portable storage device configured to be attached to and removed from a communication socket of an external device, the storage device comprising:*

*a non-volatile memory comprising at least a first memory portion and a different, second memory portion;*

*an access level determination circuit configured to determine an access level, via a communication signal transmitted across the communication socket from the external device to the storage device; and*

*a switching circuit configured to respectively prohibit a flow of electrical power from the external device across the communication socket to at least a selected one of the first memory portion or the second memory portion responsive to a magnitude of the access level transmitted across the communication socket from the external device to the storage device to prevent a transfer of read data from the at least a selected one of the first memory portion or the second memory portion across the communication socket to the external device.*

*11. The storage device of claim 10, wherein the switching circuit is further configured to permit the flow of electrical power from the external device across the communication socket to a remaining one of the first memory portion or the second memory portion responsive to the magnitude of the access level transmitted across the communication socket from the external device to the storage device to facilitate a transfer of read data from the remaining one of the first memory portion or the second memory portion across the communication socket to the external device.*

*12. The storage device of claim 10, further comprising a top level controller comprising a programmable processor configured to transfer data from the non-volatile memory to the external device, wherein the switching circuit is further configured to prohibit the flow of electrical power from the external device across the communication socket to the top level controller responsive to the magnitude of the access level transmitted across the communication socket from the external device to the storage device.*

*13. The storage device of claim 10, wherein the access level determination circuit comprises an access level storage unit which stores a range of access levels, an access level determination unit which compares the access level transmitted from the external device to the range of access levels, and an access restriction unit which activates the switching circuit responsive to the comparison of the access level and the range of access levels.*

*14. The storage device of claim 10, wherein the non-volatile memory comprises flash memory.*

*15. The storage device of claim 14, wherein the communication socket comprises a USB (Universal Serial Bus) interface connection.*

*16. The storage device of claim 10, wherein the access level determination circuit receives the access level transmitted across the communication socket responsive to interconnection of the storage device to the external device.*

*17. A method comprising:*

*ascertaining, by a storage device, an access level value set by an external device to which the storage device is coupled;*

*maintaining, at a local memory of the storage device, a range of access level values for permitting a reading of data from a non-volatile memory of the storage device; and*

*activating a switching circuit to forward electrical power supplied by the external device to the non-volatile memory responsive to the access level value falling within the range of access level values.*

*18. The method of claim 17, further comprising activating the switching circuit to prohibit the electrical power supplied by the external device from reaching the non-volatile memory responsive to the access level value falling outside the range of access level values.*

*19. The method of claim 17, wherein the storage device is coupled to the external device using a USB (Universal Serial Bus) interface, wherein the external device comprises an external device power supply that supplies the electric power to the storage device via the USB interface, and wherein the storage device comprises a limitation processor circuit and a DC/DC converter configured to receive the electric power from the external equipment power supply, the limitation processor circuit configured to selectively enable or disable the DC/DC converter in supplying the electric power to the non-volatile memory of the storage device responsive to whether the access level value set by the external device falls within the range of access level values maintained by the local memory of the storage device.*

*20. The method of claim 17, wherein the storage device is coupled to the external device using a USB (Universal Serial Bus) interface, wherein the external device comprises an external device power supply that supplies the electric power to the storage device via the USB interface, and wherein the storage device comprises a storage device controller, a limitation processor circuit and a field effect transistor (FET), the limitation processor circuit configured to enable or disable the application of the electrical power, via the FET, to the limitation processor circuit and the non-volatile memory responsive to whether the access level set by the external device falls within the range of access level values maintained by the local memory of the storage device.*

*21. The method of claim 17, wherein the non-volatile memory of the storage device is partitioned into a first portion and a different, second portion, wherein the range of*

*access level values maintained by the local memory of the storage device is a first range associated with the first portion, wherein the local memory of the storage device further maintains a second range of access level values associated with the second portion, and wherein read access to the respective first and second portions of the non-volatile memory is controlled responsive to whether the access level value set by the external device falls within the first range or the second range.*

* * * * *